United States Patent [19]

Moran et al.

[11] Patent Number: 4,595,325
[45] Date of Patent: Jun. 17, 1986

[54] SELF-LOCKING PREVAILING TORQUE FASTENER

[75] Inventors: Thomas M. Moran, Akron; Dante A. Laudi, Brooklyn, both of Ohio

[73] Assignee: Eaton Corporation, Cleveland, Ohio

[21] Appl. No.: 655,611

[22] Filed: Sep. 28, 1984

[51] Int. Cl.[4] .......................................... F16B 37/02
[52] U.S. Cl. ..................................... 411/173; 411/61; 411/175; 411/437; 411/970
[58] Field of Search ................... 411/61, 74, 103, 105, 411/106, 111, 112, 113, 172, 173, 174, 175, 182, 427, 437, 516, 520, 522, 523, 524, 525, 526, 527, 528; 24/290, 293; 52/717, 718

[56] References Cited

U.S. PATENT DOCUMENTS

| | | | |
|---|---|---|---|
| 1,817,584 | 4/1931 | Rosenberg | 411/61 |
| 2,267,379 | 12/1941 | Tinnerman | 411/516 |
| 2,364,668 | 12/1944 | Simmons | 411/437 |
| 2,370,375 | 2/1945 | Simmons | 411/437 |
| 2,389,278 | 11/1945 | Simmons | 411/437 |
| 2,390,752 | 12/1945 | Tinnerman | 411/172 |
| 2,560,518 | 7/1951 | Amesbury . | |
| 2,707,013 | 4/1955 | Flora et al. | 411/173 |
| 3,645,311 | 2/1972 | Tinnerman . | |
| 4,175,303 | 11/1979 | Benedetti | 52/718 X |
| 4,300,865 | 11/1981 | Murray | 411/175 X |

FOREIGN PATENT DOCUMENTS

| | | | |
|---|---|---|---|
| 1514108 | 1/1968 | France | 411/61 |
| 729217 | 1/1966 | Italy | 411/74 |
| 534564 | 3/1941 | United Kingdom | 411/427 |

Primary Examiner—Thomas J. Holko
Attorney, Agent, or Firm—C. H. Grace; A. E. Chrow

[57] ABSTRACT

Disclosed are two embodiments (40, 50) of a self-locking prevailing torque fastener featuring a common base portion (2) having an aperture (4) therethrough for receiving a threaded member that is at least partially surrounded by means such as a warped helical edge (6) for engaging the threads of the threaded member. Fasteners (40, 50) are provided with a pair of spaced-apart resilient torque arms having respective sections (8) that respectively extend downwardly from opposite edge of base portion (2) to sections (10) that extend upwardly to sections (12) that extend through respective openings (14) in each to respective free-ends (16) that are adapted to press against opposite sides of the threaded member. Each arm is provided with a tab (18) that extends outwardly away from section (12) and is adapted to engage opposite edges of an opening through an article such as a panel to which fastener (40, 50) is to be secured with sufficient force to inhibit loosening of the threaded member from fastener (40, 50) and also to lock the fastener to the article.

3 Claims, 3 Drawing Figures

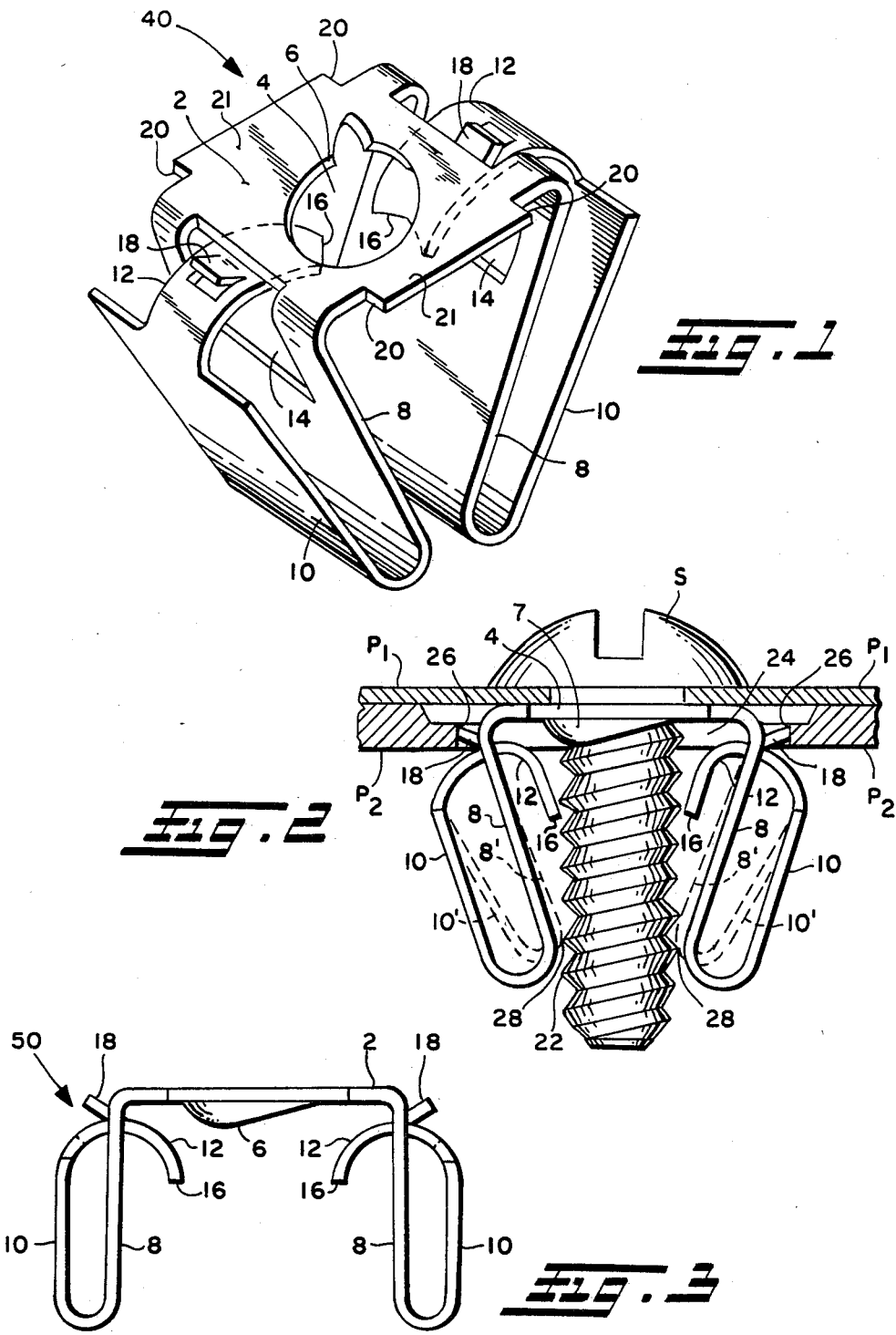

SELF-LOCKING PREVAILING TORQUE FASTENER

INTRODUCTION

This invention relates generally to a snap-in type fastener for securing a threaded member such as a screw to an article such as a plate or panel or the like through an opening therein and more particularly to a snap-in type fastener that is provided with a pair of torque arms for applying a force against opposite sides of the threaded member to inhibit its loosening from the fastener in addition to being provided with means for insuring that fastener is securely locked to the article.

BACKGROUND OF THE INVENTION

A substantial variety of snap-in type fasteners have been developed in the past for securing a threaded member to an article such as a plate or panel or the like. A considerably lesser number of snap-in type fasteners have been developed which additionally are provided with torque arms that prevent loosening of the threaded member after the fastener has been inserted into the article opening and the threaded member has been secured to the fastener.

An example of a friction nut that is provided with torque arms for applying a force resisting loosening of the threaded member from the nut is disclosed in U.S. Pat. No. 2,560,518, the disclosure of which is incorporated herein by reference. The nut, however, is not a snap-in type fastener and is not provided with a self-locking feature initiated by the threaded member.

A constant torque snap-in type fastener is disclosed in U.S. Pat. No. 3,645,311, the disclosure of which is incorporated herein by reference. The force resisting loosening of the threaded member is, however, not in the form of opposed spaced-apart arms but rather a single cantilevered portion of the thread engagement means adapted to engage only one side of the threaded member.

A snap-in type fastener is also disclosed in U.S. Pat. No. 4,300,865, the disclosure of which is incorporated herein by reference. The fastener, although provided with self-locking prongs that penetrate the article as the threaded member is tightened, is not provided with opposed spaced-apart torque arms that are able to press against opposite sides of the threaded member to inhibit its loosening.

Since there are many applications in which vibration might tend to loosen either or both the threaded member and the fastener, a need exists to provide a low cost, snap-in type fastener that is simple to manufacture and provides a self-locking feature in combination with means for applying a force against opposite sides of the threaded member to inhibit its loosening.

SUMMARY OF THE INVENTION

Accordingly, it is an object of this invention to provide a snap-in type fastener for securing a threaded member to an article such as a plate or panel or the like.

It is another object of this invention to provide a self-locking, snap-in type fastener that is adapted to apply a force against opposite sides of a threaded member sufficient to inhibit loosening of the threaded member from the fastener.

It is yet another object of this invention to provide a snap-in type fastener for securing a threaded member to an article by which the threaded member aids in locking the fastener to the article.

It is still another object of this invention to provide a low cost snap-in type fastener that is simple to manufacture and yet is provided with means for enhancing the securement of the fastener to the article as well as means for inhibit loosening of a threaded member used in conjunction with the fastener.

BRIEF DESCRIPTION OF THE DRAWINGS

FIG. 1 shows a perspective view of an embodiment of the fastener of the invention;

FIG. 2 shows a partially sectioned side elevation view of the fastener of FIG. 1; and FIG. 3 shows a side elevation view of another embodiment of the fastener of the invention.

DESCRIPTION OF SOME PREFERRED EMBODIMENTS

FIG. 1 shows an embodiment 40 of the fastener of the invention. Fastener 40 has a base portion 2 that is preferably substantially flat and has an aperture 4 therethrough that is at least partially surrounded by means for engaging threads of a threaded member that is rotationally advanced through aperture 4 from the side of the base portion 2 that faces away from the article to which fastener 40 is to be secured.

Although any suitable means at least partially surrounding aperture 4 may be used for engaging the threads of a threaded member, the thread engagement means is preferably in the form of a frusto-conical projection 7 having a warped helical edge 6 of base portion 2 surrounding aperture 4 as shown in FIG. 2. In fastener 40, projection 7 extends away from the side of base portion 2 facing towards the article to which fastener 40 is to be secured. Such frusto-conical projections provided with a warped helical edge for engaging the threads of a threaded member are well known to those skilled in the art of fasteners particularly those that are stamped from flat sheet. Alternatively, the frusto-conical projection could extend away from base portion 2 in the opposite direction where such is desired for a particular application.

Corresponding sections 8 of a pair of opposed spaced-apart resilient arms extend away from opposite edges 20 of base portion 2 in a direction downwardly and inwardly towards each other and thence turn angularly away from each other and upwardly towards base portion 2 to provide sections 10 and thence inwardly towards each other and through an opening 14 disposed through each arm and thence downwardly away from base portion 2 to respective free-ends 16 to provide a pair of spaced-apart torque arms respectively having a portion thereof that is adapted to engage opposite sides of a threaded member received from aperture 4 therebetween. The term "prevailing torque" as used herein means that the actual force applied against the threaded member is a function of the resiliencey of the torque arms and the amount of interference established between the torque arm and the threaded member.

Section 12 of the opposed resilient arms are respectively provided with tabs 18 that extend towards each other in proximity to openings 14. Tabs 18 are dimensionally adapted to engage opposite edges 26 of opening 24 of the article to which fastener 40 is to be secured as shown in FIG. 2.

The fastener of the invention is provided with means for registering tabs 18 with opposite edges of the opening through which the arms of the fastener are to be inserted. Preferably, the means for registering is provided by extensions 21 of base portion 2 as shown in FIG. 1 that respectively extend away from opposite sides of aperture 4 for a distance sufficient to provide base portion 2 with a breadth that is greater than the breadth of the article opening so that extensions 21 are able to lay against the side of the article and register tabs 18 with opposite edges of the article opening into which the opposed resilient arms of the fastener are inserted.

Although free-ends 16 of sections 12 of either or both of the opposed spaced-apart resilient arms of the fastener of the invention may be contoured to enhance their respective engagement with the threads of the threaded member inserted therebetween, they of course may be blunt ended and sections 12 turned downwardly sufficiently that a portion of sections 12 engage the crest of the threads tangentially as shown in FIG. 2.

FIG. 2 shows a threaded member such as screw "S" securing panel $P_1$ to panel $P_2$ by means of fastener 40 of FIG. 1.

The opposed resilient arms of fastener 40 were compressed towards each prior to their insertion into opening 24 of panel $P_2$ as is well known to those skilled in the art of snap-on type fasteners.

The compressed arms of fastener 40 have been inserted into opening 24 for a distance sufficient to provide registration between tabs 18 and opposite edges 26 of opening 24 and then released so that the resilient nature of the arms causes tabs 18 to respectively press against opposite edges 26 of opening 24 as shown in FIG. 2.

Screw "S" has been rotationally advanced through aperture 4 causing threads 22 of screw "S" to threadingly engage with warped helical edge 6 of projection 7 to secure screw "S" to fastener 40.

Screw "S" has been further rotationally advanced between the arms for a distance sufficient to enable respective portions of sections 12 of the arms to press against opposite sides of screw "S" as shown in FIG. 2 to provide a force thereagainst that inhibits loosening of screw "S" in fastener 40.

Additionally, screw "S" applies a substantially equal and opposite force against sections 12 of the arms that, in turn, urges tabs 18 away from each other and respectively against opposite edges 26 of opening 24 to self-lock fastener 40 to panel $P_2$.

As shown by dashed lines in FIG. 2, the arms of fastener 40 may be shaped such that a portion of sections 8' of each arm presses againt screw "S" which correspondingly shifts the position of section 10 to section 10' to provide an additional force against opposite sides of screw "S" at location 28 inhibiting its loosening in fastener 40.

FIG. 3 shows an embodiment 50 of the fastener of the invention that is substantially the same as fastener 40 except that the opposed spaced-apart sections 8 and 10 of the arms extend downwardly from base portion 2 in a substantially parallel relationship to each other rather than downwardly and inwardly towards each other as is the case with fastener 40. Fastener 50 illustrates that the arms may have any shape provided they are provided with tabs 18 and sections 12 to provide torque arms that are able to press against opposite sides of the threaded member used in conjunction with the fastener of the invention.

The fastener of the invention is preferably of a one-piece construction that is preferably stamped from flat sheet and then formed into the shape described herein. Although the fastener of the invention may be made from suitable resilient metallic or plastic material, it has been found particularly advantageous to manufacture the fastener of the invention from type 1050 steel that is approximately 0.070 inches thick.

What is claimed is:

1. A self-locking prevailing torque fastener for inserting into an article opening and securing a threaded member thereto, said fastener comprising:

a base portion having an aperture for receiving the threaded member therethrough that is at least partially surrounded by means for engaging the threads of the threaded member and securing the threaded member to the fastener in response to rotatational advancement of the threaded member through the aperture, a pair of resilient arms extending downwardly and inwardly towards each other from opposite edges of the base portion in a spaced-apart relationship sufficient to enable the threaded member to be received from the aperture therebetween and thence extending outwardly away from each other and upwardly towards the base portion and thence inwardly towards each other and through respective openings disposed in each arm on the side of the base portion facing towards the article opening and thence downwardly away from the base portion to respective free-ends thereof to provide a pair of torque arms that are spaced-apart from each other a distance sufficient to enable their respective engagement with opposite sides of the threaded member received through the aperture therebetween, a pair of tabs respectively extending from each arm outwardly away from each other in proximity to the respective openings therethrough, means for registering the fastener tabs with the opposite edges of the article opening when the arms of the fastener are inserted thereon, said tabs dimensionally adapted to respectively engage opposite edges of the article opening upon their respective registration therewith, and said tabs and said torque arms dimensionally adapted such that when the arms are inserted into the article opening, the tabs respectively press against the opening opposite edges and urge a portion of each torque arm against opposite sides of the threaded member received from the aperture therebetween with sufficient force to apply a force thereagainst that inhibits loosening of the threaded member from the fastener coupled with a substantially equal and opposite force arising from the force exerted by the threaded member in the torque arms that urges the tabs against the respective article opening opposite edges with sufficient force to lock the fastener to the article.

2. The fastener of claim 1 wherein the the means for engaging the threads of the threaded member comprise a warped helical edge of the base portion surrounding the aperture.

3. The fastener of claim 1 wherein arms extending downwardly and inwardly from opposite edges of the base portion are spaced-apart such that a portion of each engages opposite sides of the threaded member in addition to the engagement thereagainst provided by said torque arms.

* * * * *